(12) United States Patent
Liu et al.

(10) Patent No.: US 8,813,009 B1
(45) Date of Patent: Aug. 19, 2014

(54) COMPUTING DEVICE MISMATCH VARIATION CONTRIBUTIONS

(71) Applicant: Cadence Design Systems, Inc., San Jose, CA (US)

(72) Inventors: Hongzhou Liu, Sewickley, PA (US); Wangyang Zhang, Pittsburgh, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/830,696

(22) Filed: Mar. 14, 2013

(51) Int. Cl.
*G06F 17/50* (2006.01)

(52) U.S. Cl.
USPC ............................................. 716/106

(58) Field of Classification Search
CPC .............. G06F 17/5022; G06F 17/504; G06F 17/5036; G06F 17/5081; G06F 17/5045
USPC ................. 716/51, 52, 56, 106, 112
See application file for complete search history.

(56) References Cited

U.S. PATENT DOCUMENTS

2013/0226544 A1* 8/2013 Mcconaghy et al. ............. 703/2

OTHER PUBLICATIONS

D. Donoho, "Compressed sensing," IEEE Trans. Information Theory, vol. 52, No. 4, pp. 1289-1306, Apr. 2006.
E. Candes, "Compressive sampling," International Congress of Mathematicians, 2006.
J. Tropp and A. Gilbert, "Signal recovery from random measurements via orthogonal matching pursuit," IEEE Trans. Information Theory, vol. 53, No. 12, pp. 4655-4666, Dec. 2007.
X. Li, W. Zhang and F. Wang, "Large-scale statistical performance modeling of analog and mixed-signal circuits," IEEE Custom Integrated Circuits Conference, pp. 1-8, 2012.
S. Mallat and Z. Zhang, "Matching Pursuits With Time-Frequency Dictionaries," IEEE Transactions on Signal Processing, vol. 41, No. 12, pp. 3397-3415, Dec. 1993.
U. Groemping, "Relative importance for Linear Regression in R: The Package relaimpo," Journal of Statistical Software 17, issue 1, 2006.

* cited by examiner

*Primary Examiner* — Vuthe Siek
(74) *Attorney, Agent, or Firm* — Kenyon & Kenyon LLP

(57) ABSTRACT

A system, method, and computer program product for computing device mismatch variation contributions to circuit performance variation. Embodiments estimate which individual devices in a simulated circuit design have the largest impact on circuit performance, while requiring far fewer simulations than traditional multivariate linear regressions. An ordered metric allocates output variance contributions for each input mismatch parameter in a linear model. The embodiments summarize the output variance in each device, and rank the mismatch contributions based on the summarized contributions. Additional sensitivity analysis can derive a final accurate linear contribution. Embodiments can reduce required simulations by a factor of ten.

20 Claims, 6 Drawing Sheets

COMPUTING DEVICE MISMATCH VARIATION CONTRIBUTIONS

BACKGROUND

As integrated circuits scale to finer feature sizes, (e.g., with features at or below 45 nm), process variations become increasingly difficult to capture with traditional modeling techniques. Understanding statistical variations has become increasingly important in design efforts to ensure manufacturability and improve parametric yield. Mismatch variation between individual devices is particularly important, so management of mismatch variation impact on circuit performance variation should be made at the circuit design stage.

Variations in circuit performance are often modeled as an additive combination of linear variations. Each variation may typically describe a physical parameter such as an oxide thickness or a threshold voltage. A statistical transistor model may have several mismatch parameters to model its mismatch variations. However, simple linear sensitivity analysis does not provide enough information for designers to fully optimize the design. It provides only sensitivity coefficients for each mismatch parameter, and does not provide information on which particular device in a circuit design has the highest impact on overall circuit performance.

The computational expense of including circuit performance variation analysis in a design cycle can be significant or even prohibitive with current methods. The simulation time of simple OFAT (one-factor-at-a-time) sensitivity analysis generally depends on the number of devices in a circuit multiplied by the number of different mismatch parameters for each. For example, ten mismatch parameters and a thousand devices would require at least 10001 Monte Carlo circuit simulations in current OFAT sensitivity analysis schemes.

Accordingly, the inventors have identified a need for identifying important mismatch variation contributions from devices in a circuit design, and with significantly less computational expense than is required for traditional multivariate linear regression.

DETAILED DESCRIPTION

Figure 1:
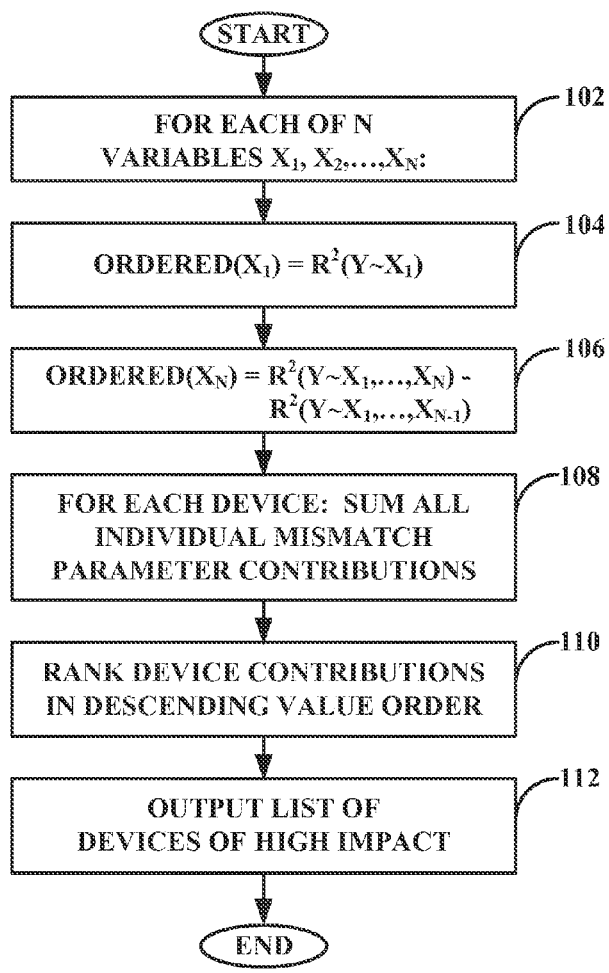
FIG. 1 is a flowchart of an output variance allocation method, according to an embodiment.

A system, method, and computer program product for computing device mismatch variation contributions to circuit performance variation are described. Inventive embodiments may first determine the individual contribution of each mismatch parameter to the circuit performance, then summarize all the individual mismatch parameters' contributions for a particular device to formulate the overall mismatch contribution for that device. The embodiments thus estimate which individual devices in a simulated circuit design have the largest impact on circuit performance. In instances where insufficient data exists for a direct solution, an underdetermined solution may be found through optimization. The result is that far fewer simulations may be required than with traditional multivariate linear regressions.

This application considers the problem of allocating variance in a circuit's performance measure as follows. Define a number of individual mismatch parameters $x_1, x_2, \ldots x_N$. Each individual mismatch parameter x may correspond to a physical variation of a particular device in the circuit design, e.g., a threshold voltage variation of device N7, or an oxide thickness variation of device P12, etc. These individual mismatch parameters may be correlated, perhaps strongly so in a semiconductor fabrication process.

Define the output y as the performance measure of interest for the entire circuit design, e.g., an amplifier's gain. The output y may be modeled as a multiple linear regression on the individual mismatch parameters:

$$y = a_0 + a_1 x_1 + a_2 x_2 + \ldots + a_N x_N + \varepsilon$$

Here the coefficients $a_0, a_1, \ldots a_N$ are coefficients to be determined, and $\varepsilon$ represents the part of the performance measure that cannot be explained by the summed weighted impact of the individual mismatch parameters. In linear regression, the coefficients are estimated by minimizing the sum of squared unexplained parts. The first aspect of the overall problem is thus to determine the individual contribution of each mismatch parameter $x_i$ to the performance y.

The coefficient of determination $R^2$, which may be considered a goodness-of-fit for a linear regression model, may be defined as:

$$R^2(y \sim x_1, \ldots, x_N) = 1 - \frac{\text{Var}(\varepsilon)}{\text{Var}(y)} = \frac{\text{Var}(a_1 x_1 + a_2 x_2 + \ldots + a_N x_N)}{\text{Var}(y)}$$

where Var( ) means sample variance. In other words, $R^2$ is a measure of what percentage of the performance measure variation may be explained by the N regressors in the model. For completely uncorrelated regressors $x_i$, each of the univariate $R^2$ values simply add up to the full model's $R^2$:

$$\frac{\text{Var}(a_1 x_1 + a_2 x_2 + \ldots + a_N x_N)}{\text{Var}(y)} = \sum_{i=1}^{N} \frac{\text{Var}(a_i x_i)}{\text{Var}(y)} = \sum_{i=1}^{N} R^2(y \sim x_i)$$

In situations where individual mismatch parameters are correlated however, it is not straightforward to allocate the performance measure's $R^2$ into contributions from the individual mismatch parameters. The order in which individual regressor contributions are evaluated may have a strong influence on the allocations. Often a first regressor selected to explain observed variation is assigned too much influence, and the remaining regressors put forth to explain the residual variation are assigned too little influence.

Two important objectives therefore need to be considered in order to reasonably define the individual contribution $x_i$ to the overall model:

Objective 1: If $x_i$ explains a lot of variance, then a high contribution should be assigned to $x_i$.

Objective 2: If the variance explained by $x_i$ can be also explained by other variables, then a lower contribution should be assigned to $x_i$.

These two objectives can conflict with each other, and can lead to different criteria for computing contributions.

One metric that has been used in the past is the so-called "first" metric, which computes the individual contributions based on the $R^2$ of a single regressor. This metric is discussed in the following reference, which is hereby incorporated by reference in its entirety: Groemping, U., "Relative Importance for Linear Regression in R: The Package relaimpo," Journal of Statistical Software 17, issue 1, 2006. The term "first" means that the amount of variance is explained if only a first regressor $x_i$ is used, and all other individual contributions are ignored. This metric is defined as:

$$\text{first}(x_i) = R^2(y \sim x_i)$$

This metric fully considers the first objective, but also fully ignores the second objective. Further, the computed sum of individual contributions may be greatly larger than the model $R^2$.

$$\sum_{i=1}^{N} \text{first}(x_i) = \sum_{i=1}^{N} R^2(y \sim x_i) >> R^2(y \sim x_1, \ldots x_N)$$

Another metric that has been used in the past is the so-called "last" metric, which allocates individual contributions based on the marginal improvement in the model $R^2$ that may be provided by a particular regressor after all other regressors have been considered. This metric is defined as:

$$\text{last}(x_i) = R^2(y \sim x_1, \ldots, x_N) - R^2(y \sim x_1, \ldots, x_{i-1}, x_{i+1}, \ldots, x_N)$$

This metric fully considers the second objective, but essentially ignores the first objective. If two strongly correlated variables both significantly impact the performance, the contribution allocated to each will both be extremely small. Also, the computed sum of individual contributions may be greatly smaller than the model $R^2$.

$$\sum_{i=1}^{N} \text{last}(x_i) << R^2(y \sim x_1, \ldots, x_N)$$

A new metric is therefore provided in this application that addresses the shortcomings of these and other known metrics for allocating contributions of regressors that are not entirely uncorrelated. The new "ordered" metric computes the contributions based on a pre-defined order indicating the prior knowledge gained on the importance of previous contributions. Suppose the order is $x_1, x_2, \ldots, x_N$. The new "ordered" metric is defined as:

$$\text{ordered}(x_1) = R^2(y \sim x_1)$$
$$\text{ordered}(x_2) = R^2(y \sim x_1, x_2) - R^2(y \sim x_1)$$
$$\vdots$$
$$\text{ordered}(x_N) = R^2(y \sim x_1, \ldots, x_N) - R^2(y \sim x_1, \ldots, x_{N-1})$$

For the "ordered" metric, the first variable $x_1$ contribution may be computed using the "first" method previously described. The last variable $x_N$ contribution may be computed using the "last" method previously described. The influences of other variables may be computed as their marginal influences in view of the influences of all previously considered variables. In other words, the influence of a given variable may be allocated as being the difference in variation due to that variable and all others considered up to that point, minus the variations due only to all others that were considered up to that point.

In the "ordered" metric, if two variables are strongly correlated, only one of them may be given a high contribution. In contrast, in such circumstances the "first" metric may yield a high contribution for both, while the "last" metric may yield a nearly zero contribution for both; such results are clearly inadequate. The "ordered" metric has the further advantage that the computed sum of individual contributions is exactly equal to the model $R^2$:

$$\sum_{i=1}^{N} \text{ordered}(x_i) = R^2(y \sim x_1, \ldots, x_N)$$

This new metric may allow the improved solution of the second part of the overall problem: summarizing the individual mismatch parameters' contributions for a particular device to formulate the overall mismatch contribution for that device. When using the "ordered" metric, the computed sum of the individual devices' contributions is exactly equal to the model $R^2$. In other words, the circuit performance variation may be modeled as entirely due to the sum of all allocated device contributions, as each device contribution is the sum of individual allocated parameter contributions.

Individual device mismatch contributions may be sorted after computation, from greatest to least. The rank order of a device's mismatch contribution may thus be used to identify which devices have higher impact on the circuit's performance variation. The overall circuit performance variation may be related to circuit yield or design robustness, so proper simulation of variation may advance the commercial success of a circuit design.

Referring now to FIG. 1, a flowchart of an output variance allocation method as described above is shown, according to an embodiment. At 102, an array of variables $x_1$ to $x_n$ representing individual mismatch parameters is inputted, with the numbering being arbitrary. At 104, the contribution allocated to the first mismatch parameter $x_1$ is defined according to the "ordered" metric, which for this first variable is the same as the "first" metric would define, which is the coefficient of determination $R^2$ considering only the first mismatch parameter. At 106, the contributions allocated to the remaining mismatch parameters are defined according to the "ordered" metric that considers the influences of each further variable as being their marginal influences in view of the influences of all previously considered variables. At 108, the individual mismatch parameter contributions corresponding to a particular device may be summed to yield that particular device's total contributions to performance variance. At 110, the device contributions may be ranked in descending value order. At 112, the method may output a list of devices having high impact, that is, the highest device contributions to performance variance, along with the numerical contribution values.

Further non-obvious advances in the state of the art of circuit design may be realized by the process described above when combined with the approach now described. Normally, the number of samples is generally equal to or larger than the number of parameters to build a linear regression model. While in some instances data may be available for computing all the individual mismatch parameters for all the devices in a circuit, in other instances such complete data may not be available. Since the total number of parameters can be very large, obtaining a similarly large number of samples may require significant and perhaps prohibitive time for simulation. Typically therefore only limited sample data are available to calculate the mismatch contributions, due to computational expense.

How can the regression model be solved if the available samples are fewer in number than the input parameters? Also, the "ordered" metric variance allocation requires a fixed order for computing mismatch parameters. Different input variable orders will give different variance allocation results, so how are the input variables ordered? A new approach should consider these limitations.

Solving a system of linear equations (e.g., $A \cdot \alpha = B$) is a key step in many engineering problems. To obtain a unique solution from a linear system, traditionally the number of equations N should be at least the number of variables M. However, with the additional knowledge that the solution $\alpha$ is sparse (i.e., contains few non-zero variables), the solution may be estimated by solving the following optimization:

$$\text{Minimize } \|\bullet\|_0 \text{ with } \alpha \text{ subject to } A \cdot \alpha = B,$$

where $$\|\bullet\|_0$$

denotes the number of non-zeros in a vector. It is equivalent to the following problem:

$$\text{Minimize } \|A \cdot \alpha = B\|_2 \text{ subject to } \|\bullet\|_0 \leq k \text{ with } \alpha.$$

The equality constraint may be relaxed to allow error tolerance on noise, modeling error, etc., so the optimization becomes:

$$\text{Minimize } \|\bullet\|_0 \text{ with } \alpha \text{ subject to } \|A \cdot \alpha = B\|_2 \leq \varepsilon,$$

where $$\|\bullet\|_2$$

is the L2-norm (root sum of squares) of a vector.

In general, exactly solving these optimizations is NP-hard. However, several approximation algorithms have recently been proposed that can efficiently solve these optimizations in polynomial time. Moreover, it has been theoretically demonstrated that for a linear system where the A matrix is formed from independent Gaussian random variables (which is often the case for process variation in integrated circuits), the first optimization can be exactly solved with only $O(S \cdot \log M)$ equations, where S denotes the number of non-zeros. The accuracy is also proven to degrade gracefully with the increase of noise in the case of the second optimization. These results suggest that if sparsity can be found in a modeling problem, the model can be accurately built with significantly fewer samples. The following reference discusses this concept further, and is hereby incorporated by reference in its entirety: Tropp, J. and Gilbert, A., "Signal recovery from random measurements via orthogonal matching pursuit," IEEE Trans. Information Theory, vol. 53, no. 12, pp. 4655-4666, 2007.

Identifying the most important variables with as few Monte Carlo simulation samples as possible is a commercially important objective. The regression coefficients are often sparse in circuit simulations, as many device level variations have little impact on the performance measure of interest. Further, at the circuit level, the performance may only be strongly related to few transistors. Therefore, the number of samples needed for solving the optimization above grows only logarithmically with the number of variables, which makes mismatch contribution calculation possible even for large circuits.

Figure 2:
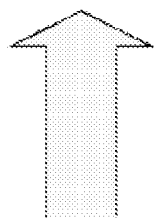
FIG. 2 is a diagram of a sparse linear system in matrix form, according to an embodiment.

Orthogonal matching pursuit (OMP) is a new technique to solve an underdetermined linear system. Matching pursuit (MP) in general is a type of numerical technique that involves finding the best matching projections of multidimensional data onto a weighted set of functions. OMP is an extension that updates all the coefficients extracted at a given point after every iterative step by computing the orthogonal projection of the data onto the set of functions evaluated so far. OMP provides the possibility to solve the linear regression modeling problem with fewer samples than the number of parameters, as described. OMP solves the linear system by finding the best sparse approximation to the regression model using k coefficients. However, the locations of the k non-zero values are unknown, as shown in FIG. 2.

Figure 3:
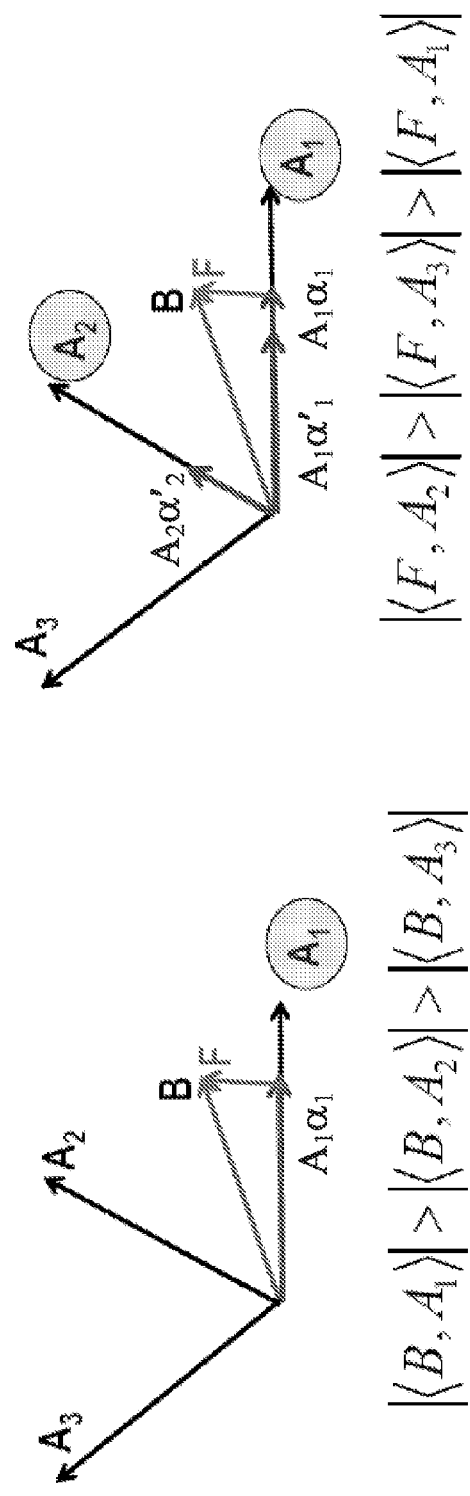
FIG. 3 is a diagram of orthogonal matching pursuit computations, according to an embodiment.

The operation of OMP may be described by a graphical example, as shown in FIG. 3. OMP is a greedy iterative method to solve the optimization problem by finding k basis functions. For each iteration, the OMP scheme: (1) calculates inner products to select one additional basis function, and (2) calculates least squares to re-evaluate the coefficients. For example let $A_1$, $A_2$, and $A_3$ be basis functions and B is a vector to be modeled as linear weighted combinations of those basis functions. An initial estimate of B might be $A_1 \alpha_1$, where $\alpha_1$ is a weighting coefficient for $A_1$ which is the vector most closely approximating B (that is, the dot product of $A_1$ and B is greater than the dot products of either $A_2$ and B or $A_3$ and B). This estimate fails to model remainder vector F, however. Thus, in the second diagram of FIG. 3, a contribution from $A_2$ is found that models as much of vector F as possible, and new coefficient values $\alpha'_1$ and $\alpha'_2$ are computed such that the linear combination of $A_1 \alpha'_1$ and $A_2 \alpha'_2$ models B as closely as possible with two basis functions.

The method of using OMP to calculate the regression coefficients may simply comprise normalizing all mismatch parameters, then applying OMP to build the linear regressors. The greedy based OMP method will generate regression coefficients in best-fitting order, and will stop when enough variance is explained in the model. A nonlinear term may even be added as an input to capture nonlinear contributions in the OMP model. The required sample data may be significantly less than the number of input parameters. There is no need to recalculate $R^2$ because it is part of the results of the OMP method.

Figure 4:
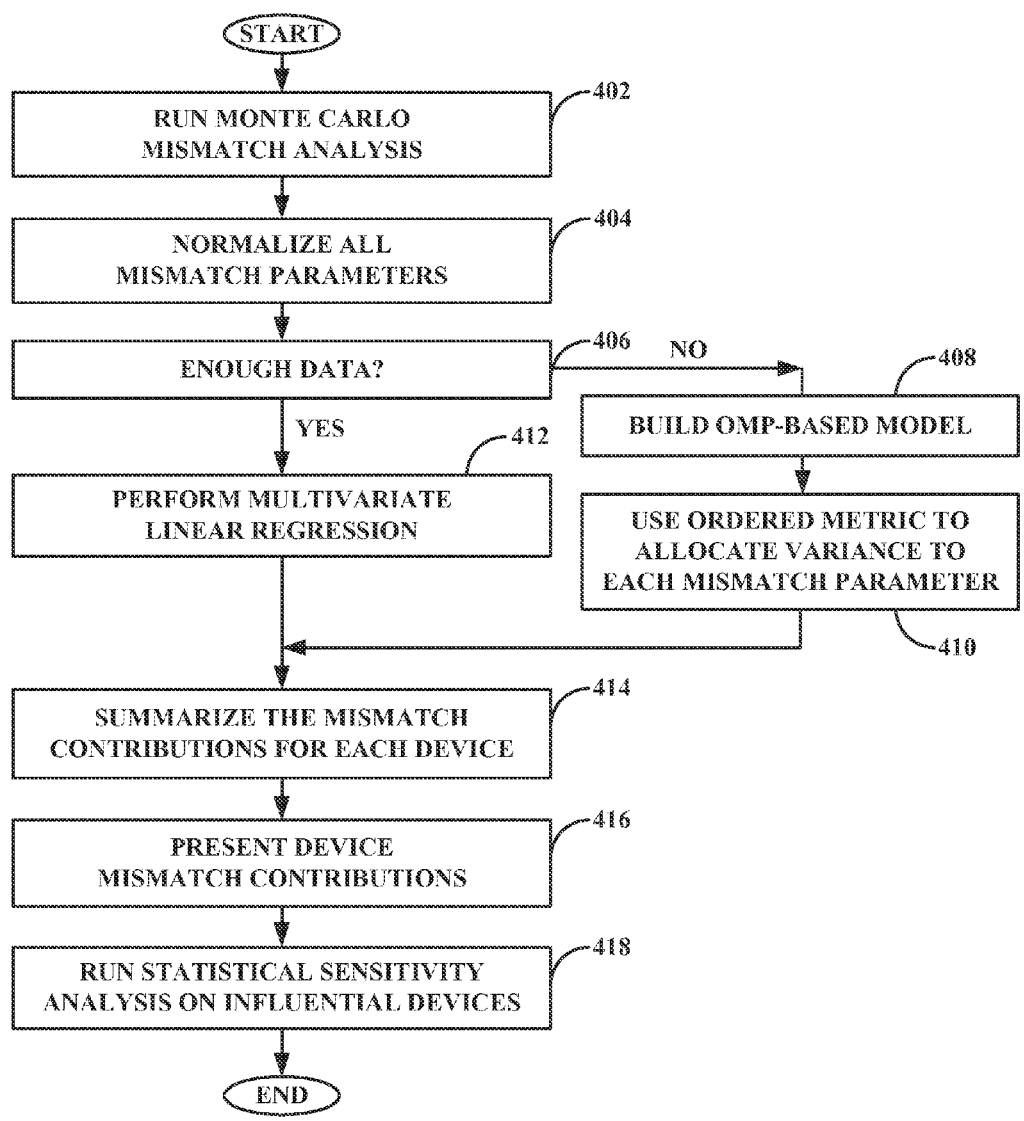
FIG. 4 is a flowchart of a mismatch contribution analysis method, according to an embodiment.

Referring now to FIG. 4, a flowchart of a mismatch contribution analysis method is shown, according to an embodiment. At 402, the method may run a Monte Carlo mismatch analysis to acquire data on circuit performance and its variation. At 404, the method may normalize all the individual mismatch parameters. At 406, the method may determine whether there is enough data available to directly solve for all coefficients in the multivariate linear regression model. If not, the method may proceed to 408 and 410 to determine an optimized approximate solution, and if so the method may proceed to 412 to perform the multivariate linear regression evaluation. Determining an optimized approximate solution may include building an OMP-based model at 408 and using the ordered metric to allocate variance to each individual mismatch parameter at 410. The method may continue at 414 by summarizing the mismatch contributions for each device, by summing all individual contributions corresponding to each device. At 416, the device mismatch contributions may be presented, in at least one of a flat view and a hierarchical view for example. At 418, the method may run a statistical sensitivity analysis on those devices that most highly influence circuit performance variation.

Figure 5:
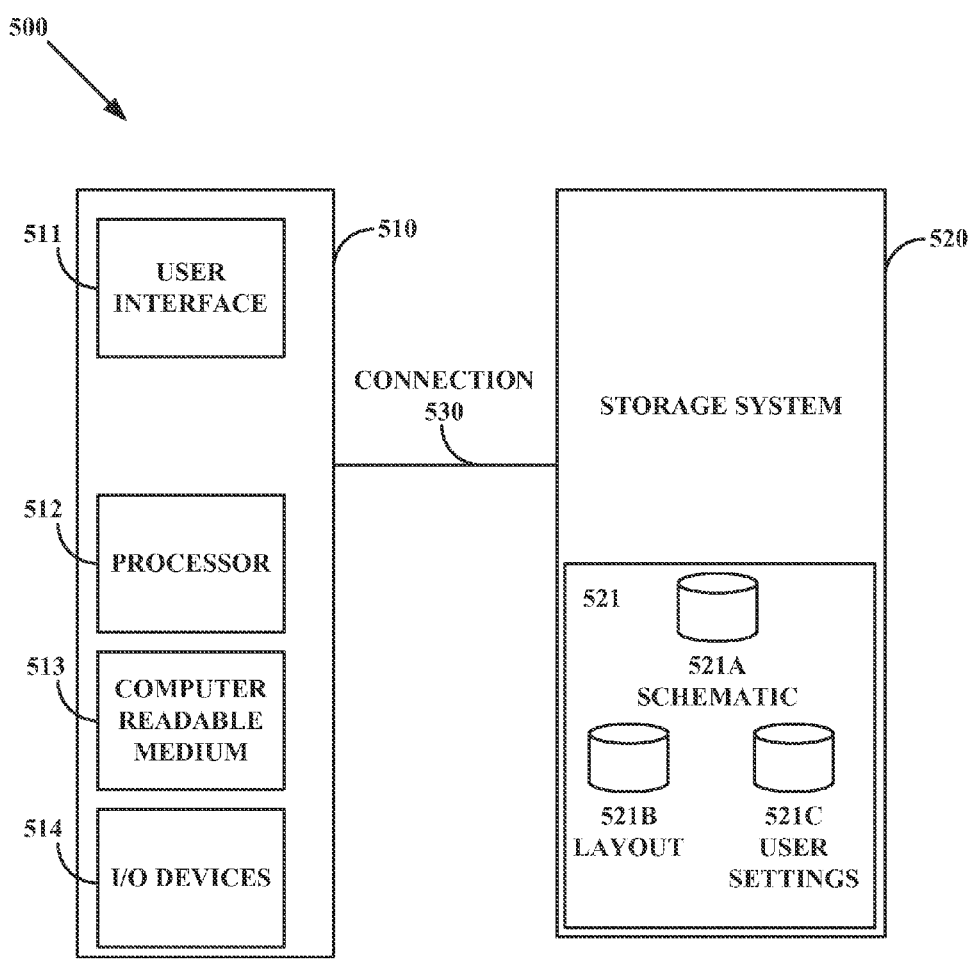
FIG. 5 is a block diagram of an analog fault simulation system, according to an embodiment.

Referring now to FIG. 5, a block diagram of an exemplary mismatch variation simulation system 500 is shown according to an embodiment. This system may provide simulator functionality for any of the methods described above. A user may access the mismatch variation sensitivity analysis system 500 through a standalone client system, client-server environment, or a network environment. System 500 may comprise one or more clients or servers 510, one or more storage systems 520, and a connection or connections 530 between and among these elements.

Client 510 may execute instructions stored on a computer readable medium that provides a user interface 511 that may allow a user to access storage system 520. The instructions may be part of a software program or executable file that may operate electronic design automation (EDA) software. Client 510 may be any computing system, such as a personal computer, workstation, or other device employing a processor which is able to execute programming instructions. User interface 511 may be a GUI run in a user-controlled application window on a display. A user may interact with user interface 511 through one or more input/output (I/O) devices 514 such as a keyboard, a mouse, or a touch screen.

Storage system 520 may take any number of forms, including but not limited to a server with one or more storage devices attached to it, a storage area network, or one or a plurality of non-transitory computer readable media. Databases 521 may be stored in storage system 520 such that they may be persistent, retrieved, or edited by the user. Databases 521 may include a schematic database 521A, a layout database 521B, and a user input database 521C. These databases may be kept as separate files or systems, or may be merged together in any appropriate combination.

Only one client 510 is shown connected to storage system 520 through connection 530, which may be a simple direct wired or wireless connection, a system bus, a network connection, or the like, to provide client 510 with access to storage system 520. In another aspect, connection 530 may enable multiple clients 510 to connect to storage system 520. The connection may be part of a local area network, a wide area network, or another type of network, again providing one or more clients with access to storage system 520. Depending on system administrator settings, client 510's access to system storage 520 or to other clients may be limited.

Figure 6:
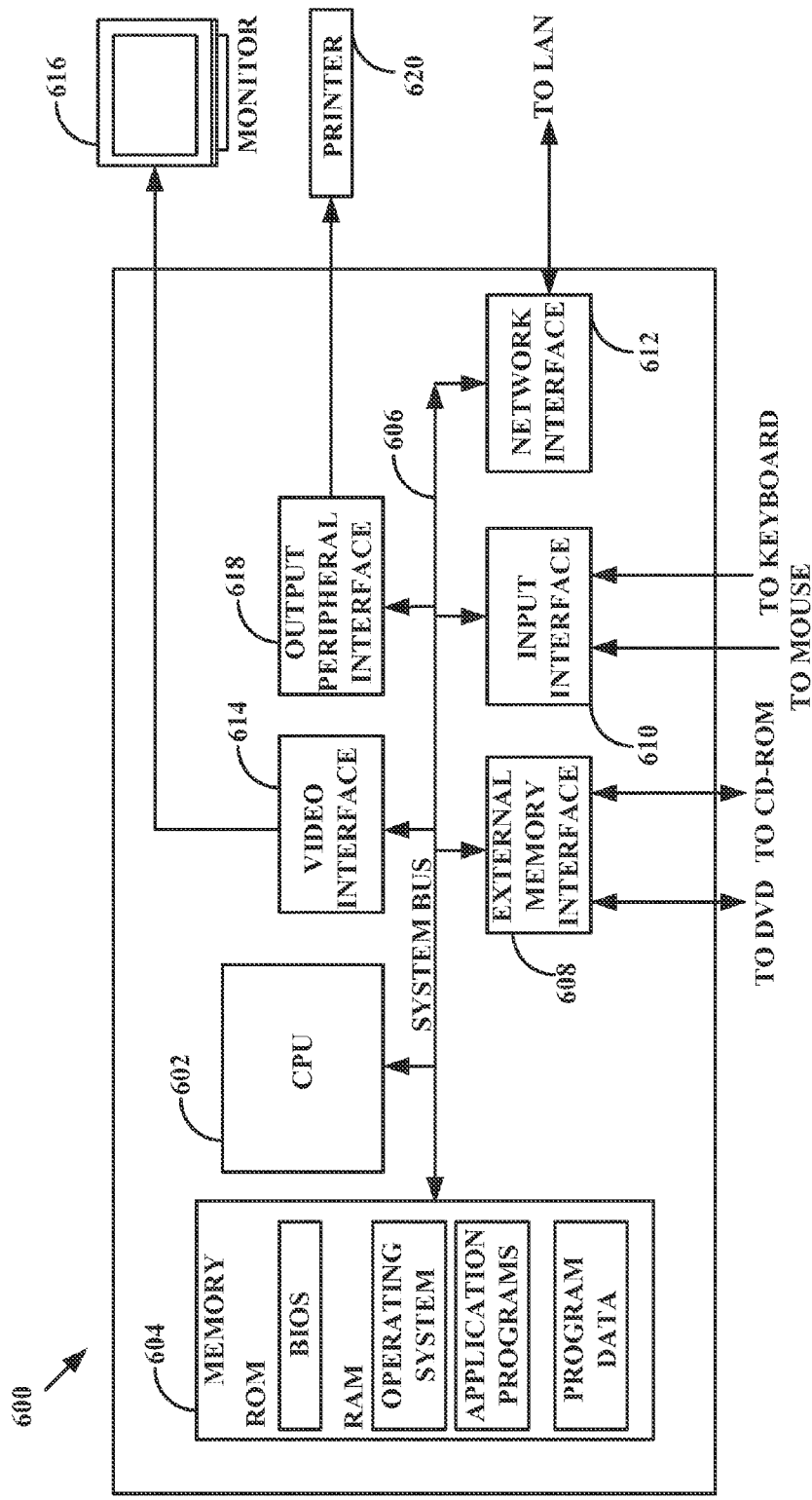
FIG. 6 is a diagram of a computer system, according to an embodiment.

FIG. 6 depicts a computer system comprising the structure for implementation of the embodiments described above. Computer system 600 comprises a central processing unit (CPU) 602 that processes data stored in memory 604 exchanged via system bus 606. Memory 604 typically includes read-only memory, such as a built-in operating system, and random-access memory, which may include an operating system, application programs, and program data. Computer system 600 also comprises an external memory interface 608 to exchange data with a DVD or CD-ROM for example. Further, input interface 610 may serve to receive input from user input devices including but not limited to a keyboard and a mouse. Network interface 612 may allow external data exchange with a local area network (LAN) or other network, including the internet. Computer system 600 also typically comprises a video interface 614 for displaying information to a user via a monitor 616. An output peripheral interface 618 may output computational results and other information to output devices including but not limited to a printer 620.

Computer system 600 may comprise for example a personal computer or an engineering workstation, each of which is widely known in the art and is commonly used for integrated circuit design tasks, along with software products commercially available for performing computer-aided integrated circuit design tasks including mismatch variation simulation. The computer system of FIG. 6 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A computer-implemented method for analyzing circuit performance variations, comprising:
using a computer, allocating circuit performance variation by weighting individual mismatch parameters in a multiple linear regression model;
summarizing device performance variation contributions by summing all weighted individual mismatch parameter values corresponding to the devices in a circuit design;
ranking the device performance variation contributions; and
identifying and outputting at least one influential device according to device performance variation contribution rank order.

2. The method of claim 1 wherein the weighting further comprises assigning circuit performance variation contributions to individual mismatch parameters with an ordered metric.

3. The method of claim 2 wherein the assigning further comprises evaluating a coefficient of determination for each individual mismatch parameter according to its marginal influence over the influences of all previously considered individual mismatch parameters.

4. The method of claim 1 wherein the allocating further comprises approximating the weighting by optimizing selected sparse factors against limited sample data.

5. The method of claim 4 wherein an orthogonal matching pursuit performs the optimizing.

6. The method of claim 1 further comprising performing a statistical sensitivity analysis on selected influential devices.

7. The method of claim 1 further comprising increasing at least one of circuit performance, circuit yield, and circuit design robustness.

8. A non-transitory computer readable medium storing instructions that, when executed by a processor, perform a method for allocating circuit variance into device mismatch parameters, the method comprising:
allocating circuit performance variation by weighting individual mismatch parameters in a multiple linear regression model;
summarizing device performance variation contributions by summing all weighted individual mismatch parameter values corresponding to the devices in a circuit design;
ranking the device performance variation contributions; and
identifying and outputting at least one influential device according to device performance variation contribution rank order.

9. The medium of claim 8 wherein the weighting further comprises assigning circuit performance variation contributions to individual mismatch parameters with an ordered metric.

10. The medium of claim 9 wherein the assigning further comprises evaluating a coefficient of determination for each individual mismatch parameter according to its marginal influence over the influences of all previously considered individual mismatch parameters.

11. The medium of claim 8 wherein the allocating further comprises approximating the weighting by optimizing selected sparse factors against limited sample data.

12. The medium of claim 11 wherein an orthogonal matching pursuit performs the optimizing.

13. The medium of claim 8 wherein the method further comprises performing a statistical sensitivity analysis on selected influential devices.

14. The medium of claim 8 wherein the method further comprises increasing at least one of circuit performance, circuit yield, and circuit design robustness.

15. A system for allocating circuit variance into device mismatch parameters, the system comprising:
a non-transitory computer-readable medium to store a circuit design;
a processor executing instructions to:
allocate circuit performance variation by weighting individual mismatch parameters in a multiple linear regression model;
summarize device performance variation contributions by summing all weighted individual mismatch parameter values corresponding to the devices in a circuit design;
rank the device performance variation contributions; and
identify and output at least one influential device according to device performance variation contribution rank order.

16. The system of claim 15 wherein the weighting further comprises assigning circuit performance variation contributions to individual mismatch parameters with an ordered metric.

17. The system of claim 16 wherein the assigning further comprises evaluating a coefficient of determination for each individual mismatch parameter according to its marginal influence over the influences of all previously considered individual mismatch parameters.

18. The system of claim 15 wherein the allocating further comprises approximating the weighting by optimizing selected sparse factors against limited sample data.

19. The system of claim 18 wherein an orthogonal matching pursuit performs the optimizing.

20. The system of claim 15 wherein the processor further executes instructions to perform a statistical sensitivity analysis on selected influential devices.

* * * * *